(12) United States Patent
Braun et al.

(10) Patent No.: US 9,469,064 B2
(45) Date of Patent: Oct. 18, 2016

(54) SIDE BLOWING MOLDING APPARATUS AND METHOD

(71) Applicants: Clifford John Braun, Harbor Beach, MI (US); Gregory Robert Schave, Port Hope, MI (US); Christopher L. Verellen, Harbor Beach, MI (US)

(72) Inventors: Clifford John Braun, Harbor Beach, MI (US); Gregory Robert Schave, Port Hope, MI (US); Christopher L. Verellen, Harbor Beach, MI (US)

(73) Assignee: GEMINI GROUP, INC., Bad Axe, MI (US)

( * ) Notice: Subject to any disclaimer, the term of this patent is extended or adjusted under 35 U.S.C. 154(b) by 0 days.

(21) Appl. No.: 13/888,804

(22) Filed: May 7, 2013

(65) Prior Publication Data

US 2013/0241119 A1    Sep. 19, 2013

Related U.S. Application Data

(63) Continuation of application No. 12/824,869, filed on Jun. 28, 2010, now abandoned.

(51) Int. Cl.
*B29C 49/04* (2006.01)
*B29C 49/60* (2006.01)

(52) U.S. Cl.
CPC ............. *B29C 49/04* (2013.01); *B29C 49/60* (2013.01)

(58) Field of Classification Search
None
See application file for complete search history.

(56) References Cited

U.S. PATENT DOCUMENTS

| | | | |
|---|---|---|---|
| 3,048,891 A | 8/1962 | Maass | |
| 3,973,896 A | 8/1976 | Peters | |
| 4,028,034 A | 6/1977 | Hahn | |
| 4,035,461 A * | 7/1977 | Korth | 264/534 |
| 4,332,750 A | 6/1982 | Roggenburg | |
| 4,799,876 A | 1/1989 | Peters | |
| 5,078,948 A | 1/1992 | Troutman | |
| 5,403,538 A * | 4/1995 | Maeda | 264/530 |
| 5,863,489 A * | 1/1999 | Flood et al. | 264/531 |
| 6,090,339 A | 7/2000 | Raboin | |
| 6,440,353 B1 | 8/2002 | Hutchins | |
| 6,537,056 B1 | 3/2003 | Omi | |
| 7,153,127 B2 * | 12/2006 | Struble et al. | 425/525 |
| 2006/0204606 A1 | 9/2006 | Ohno | |
| 2008/0038497 A1 | 2/2008 | Nemoto | |

\* cited by examiner

*Primary Examiner* — Monica Huson
(74) *Attorney, Agent, or Firm* — Varnum, Riddering, Schmidt & Howlett LLP

(57) ABSTRACT

A side blow molding apparatus of (100) includes upper guide rails (106) and lower guide rails (108). The apparatus (100) includes a side blow device (110) having a blow pin assembly (112) and an inner support assembly (114). The blow pin assembly (112) includes a blow pin driver (116) formed as a cylinder (118). The blow pin assembly (112) also includes a blow pin (122) connected to a shuttle system (124) which, in turn, is connected to the cylinder (118). The shuttle system (124) operates so as to move the blow pin (122) in a linear manner. The inner support assembly (114) includes an inner support driver (138) connected to an extender (144). The inner support driver (138) extends and retracts the extender (144) for raising and lowering the inner support (142). The blow pin (122) is positioned on the shuttle system (124) so that the pin (122) can be shuttled in and out of a parison during the blow molding process.

1 Claim, 2 Drawing Sheets

SIDE BLOWING MOLDING APPARATUS AND METHOD

CROSS-REFERENCE TO RELATED APPLICATIONS

This application is a continuation of application Ser. No. 12/824,869 filed Jun. 28, 2010.

STATEMENT REGARDING FEDERALLY SPONSORED RESEARCH OR DEVELOPMENT

Not applicable.

REFERENCE TO MICROFISHE APPENDIX

Not applicable.

BACKGROUND OF THE INVENTION

1. Field of the Invention

The invention relates to apparatus and methods for forming plastic articles and, more particularly, to apparatus and methods employing principles of blow molding.

2. Background Art

Blow molding technology associated with the forming of relatively hollow, plastic articles is often referred to as "extrusion blow molding." Basic principles of extrusion blow molding technology for making hollow thermoplastic shapes are described in the *Modern Plastics Encyclopedia* 1979, 1980, beginning on page 230. The text of this publication is incorporated herein by reference.

In brief summary, known extrusion blow molding technology for forming thermoplastic articles utilizes molten plastic which is extruded downwardly within a blow molding apparatus, in the form of a parison. A "parison" can be characterized as being typically cylindrical in shape and formed of plastic. Once the plastic has been extruded into the form of the parison, the blow molding apparatus can close a mold around the parison. When the mold has been appropriately closed, air can be injected and forced into the parison, which is characterized as "blow molding" plastic. As the air is being forced inside of the parison, the cavity formed by the parison in the mold is pressurized. The molten plastic is therefore forced against the outer walls of the mold.

When the plastic article to be formed is sufficiently cooled, the article can be ejected from the mold. It should be noted that with this process, the inner wall of the article (formed inside of the parison) is formed only by the pressurization of the cavity. This inner wall can therefore vary relatively significantly by either the thickness of the parison, or the shape of the article. Accordingly, known blow molding apparatus and methods associated therewith can have certain disadvantages when customers for the plastic articles require relatively tight tolerances on the inner walls of the plastic articles.

As previously stated, various apparatus and methods have been developed relating to concepts associated with blow molding plastic articles. To overcome the problem of providing for relatively tight tolerances for inner walls of the blow molded articles, it is known to use a blow molding technique referred to as "bottom blow" technology. This and other blow molding apparatus and methods known in the prior art are described in the following references.

More specifically, Maass, U.S. Pat. No. 3,048,891, issued Aug. 14, 1962, discloses a blow molding machine and associated process for forming hollow articles from organic plastic material. In particular, the Maass patent discloses the concept of insertion of coring pins 66 into the ends of a parison, before entry of a blow pin or a needle 74 into the side. This function is performed so as to form a final article having a walled core structure.

Peters, U.S. Pat. No. 3,973,896, issued Jan. 24, 1989, discloses the concept of a blow molding apparatus with a mandrel carried by portions of the mold, and movable between extended or retracted positions. The mandrel has a free end with a vacuum surface area portion. The free end is engageable with the parison when the mandrel is in the extended position. A blow needle is reciprocally mounted in the mandrel. Insertion of the needle into the parison is facilitated by the parison being held against the end of the mandrel by the vacuum.

Troutman, et al, U.S. Pat. No. 5,078,948, issued Jan. 7, 1992, discloses a particular blow needle structure having a tubular portion and a cutting tip atop the tubular portion. The cutting tip includes three or more blades terminating in a point. The tubular portion includes passages which communicate with the source of pressurized fluid. The "arrow head" needle penetrates the parison and forms "flap sections" in the parison. The needle tip pushes the flap sections inwardly within the parison.

Omi et al, U.S. Pat. No. 6,537,056, issued Mar. 25, 2003 is also directed to a specific structure for a needle blow nozzle. The needle blow nozzle includes a tubular body with a needle portion, needle center, slopes and nozzle holes. The needle is laterally inserted into a parison for jetting air into the interior of the parison. The slopes are formed so as to extend from the needle center toward an outer peripheral surface of the tubular body. In this manner, edges are provided which extend at an acute angle, and the nozzle holes are formed in the needle portion.

Other patent references found in our search are directed to several other concepts associated with blow molding assemblies and processes. For example, Hahn, U.S. Pat. No. 4,028,034, issued Jun. 7, 1977, is directed to a method and apparatus for blow molding plastic, where the mold has a quadrasectional configuration. Particles are extruded from an extrusion unit 10 as a tubular configuration 16 for introduction within the mold 18. The article is blow-molded using an expanded fluid introduced through a hollow needle 32 at the side of the mold. The article is severed into two portions through the use of a hot wire.

Roggenburg, Jr., et al, U.S. Pat. No. 4,332,750, issued Jun. 1, 1982, discloses a blow molding apparatus having a gate which connects the blow molded hollow shapes to the parison. Subsequent degating of the shapes is provided by ultrasonic mechanical vibrations applied to the gates.

Peters, U.S. Pat. No. 4,799,876, issued Jan. 24, 1989, is primarily directed to a blow needle configuration. The needle includes a sealing member which surrounds the blow needle. During inflation of the parison, projections come into sealing contact with the exterior surface. This concept is disclosed as preventing leakage of blow gas from the interior of the parison around the blow needle.

Raboin, U.S. Pat. No. 6,090,339, issued Jul. 18, 2000, is directed to a process for manufacture of a blow-molded plastic extruded product having a specific configuration. The blow mold apparatus includes a pair of mold sections which are closed along a linear direction of travel. When closed, they form a mold cavity which includes a narrow section extending in the direction of travel. This section has a width which is less than approximately twice a wall thickness of the parison. As the mold sections close, they sever and enclose a segment of the parison within the mold cavity, and shear a double-wall section of the parison into the narrow section. This forms a reinforcing flange on the resultant product.

Hutchins, U.S. Pat. No. 6,440,353, issued Aug. 27, 2002, is directed expressly to a vacuum forming method for twin-sheet vacuum forming parts in a vertical orientation. With twin or dual-sheet forming, two sheets of plastic sheet are parallel-laid in a horizontal fashion, and heated to a predetermined temperature. In the Hutchins method, two parallel sheets of plastic synthetic resin are clamped together in a vertical orientation to a clamping tray. The sheets directly contact each other about the perimeter of the tray. Air is then blown between the sheets so as to create the appropriate hollow cavity, and the sheets are heated to molding temperatures in a vertical orientation. A vertically-oriented split mold is then opened, with the mold cavities having a contour which conforms with configuration of the desired article. The two parallel sheets are then disposed between the opposing mold cavities of the split mold, and negative pressure is applied to vacuum section holes provided in the mold cavities. The split mold is then closed so as to form a "pinch off" around the perimeter of the hollow cavity. In this manner, a molded hollow part is formed which is still disposed within the clamping tray. A blow pin is then inserted into the hollow cavity for blowing compressed air into the cavity to push the parallel sheets against the mold cavities. The molded part is then cooled to a set point, the vertically-oriented split mold is opened, and the clamping tray withdrawn.

Ohno, et al, U.S. Patent Application Publication No. 2006/0204606, published Sep. 14, 2006, is directed to cooling processes associated with blow molding methods and apparatus. More specifically, upper and lower portions of a parison are forcibly cooled, using upper and lower holes of respective needle blow nozzles. The metallic mold is cooled specifically by a cooling apparatus within the mold. The upper clamp portion and lower clamp portion formed on the upper and lower portions of the parison, respectively, are cooled by air which passes only through an upper discharge hole formed on the upper needle blow nozzle and a lower discharge hole formed on the lower needle blow nozzle.

Nemoto, U.S. Patent Application Publication No. 2008/0038497, published Feb. 14, 2008, is directed to a blow molding die assembly and associated methods for manufacture of resin hollow bodies. One of the die assemblies comprises a pair of main dies which are formed with a dividable cavity, by closing open end surfaces with each other. A pair of slide dies is disposed outside of the main pair of dies, and have abutting portions that move between first positions where the abutting portions project outwardly from the open end surfaces, and second positions where the abutting portions are located inward of the open end surfaces of the main dies. A method for manufacturing resin hollow bodies uses the aforementioned die assembly with a series of opening and closing steps.

As earlier stated, problems exist with respect to a number of the prior art apparatus and methods associated with blow molding technology when the formed article requires relatively tight or small tolerances with respect to the thickness of the parison or the shape of the article itself. For example, and as earlier stated, it is known to employ what is characterized as a "bottom blow" process which provides at least some improvement over other known processes for generating blow molded plastic articles having relatively tight tolerances on the inner walls of the articles. Assuming that the article to be formed includes a neck portion, the bottom blow process involves dropping the parison over a machine and blow pin. The blow pin remains inside the mold, and forms the inner diameter of the neck of the article. Such a process could possibly be applied to blow molded articles such as necks of engine resonators. Such engine resonators utilize what is often referred to as "Helmholtz resonance," which is essentially the phenomenon of air resonance within a cavity. Airboxes and other components of internal combustion engines use the principles of Helmholtz resonance for sound muffling and other purposes. In the fabrication of engine resonators, the dimensions of the necks of the resonators are of particular importance in proper operation. Accordingly, tight tolerances are required on the "inner diameter" or inside wall of the resonator necks. In fact, tolerances on the order of +/−0.5 millimeters may be considered. However, with bottom blow processes, it is often difficult to accurately form a desired length and shape of various types of resonators and other blow molded articles. In particular, for certain shapes and article lengths, the required parisons for such articles to be bottom blown would be extremely difficult to program into a molding apparatus.

SUMMARY OF THE INVENTION

In accordance with the invention, a method for forming plastic articles utilizes the principles of blow molding and employs a blow mold and a blow pin. An operational sequence is initiated, with the blow mold in an open position and the blow pin in a retracted or home position. A parison is then extended over an inner support. A blow pin driver is activated, and causes a shuttle system of a side blow device to operate, so as to extend the blow pin sufficiently to pierce the parison.

The inner support guide can then be retracted, and the blow mold can be closed. A forming and cooling cycle can then be initiated and operated. Following the cycle, the blow pin can be refracted and the resultant plastic article can be ejected. The extender can then be extended and the inner support device can be repositioned to an initial position.

BRIEF DESCRIPTION OF THE DRAWINGS

The invention will now be described with reference to the drawings, in which.

DESCRIPTION OF THE PREFERRED EMBODIMENT

Figure 1:
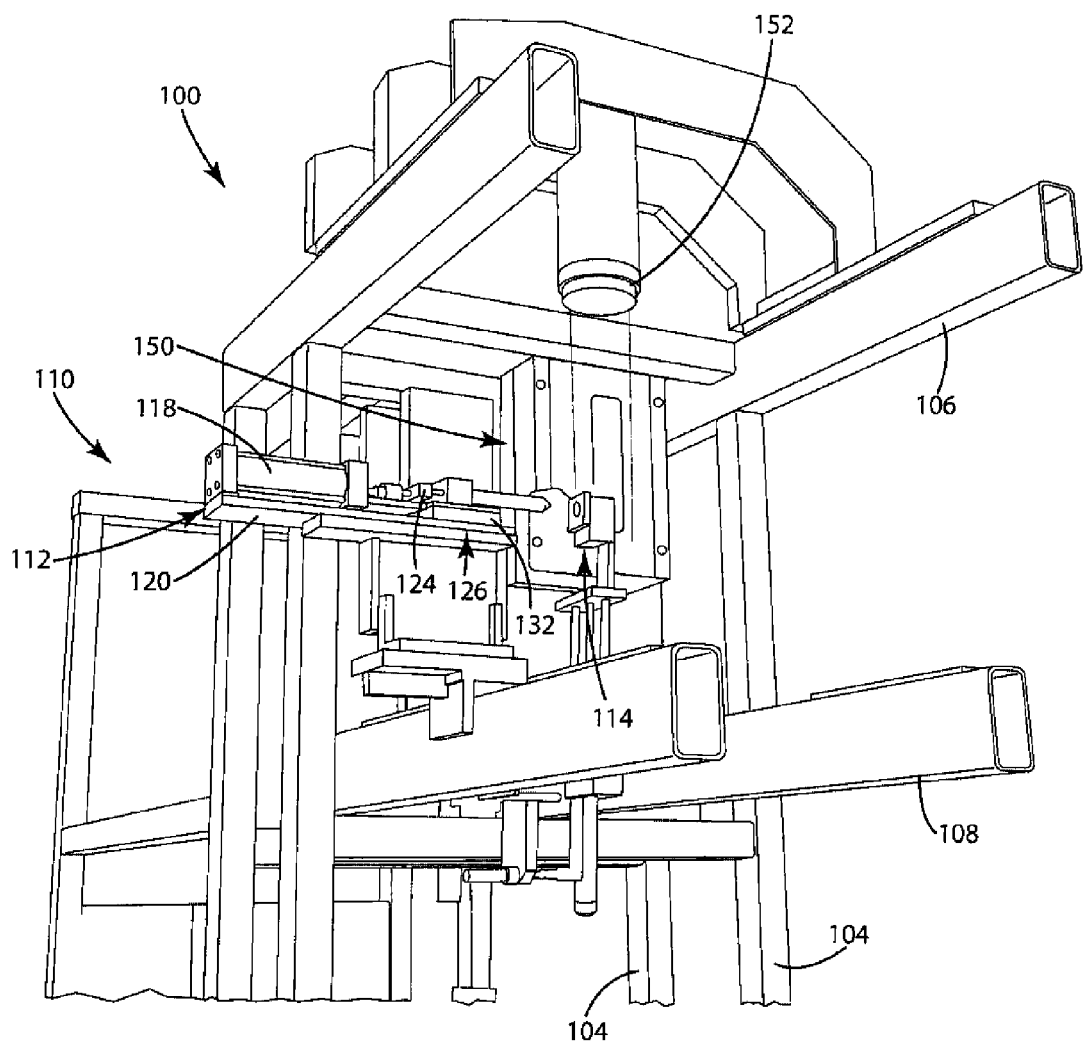
FIG. 1 is a perspective view of a side blow molding apparatus, having a side blow pin assembly in accordance with the invention.
Figure 2:
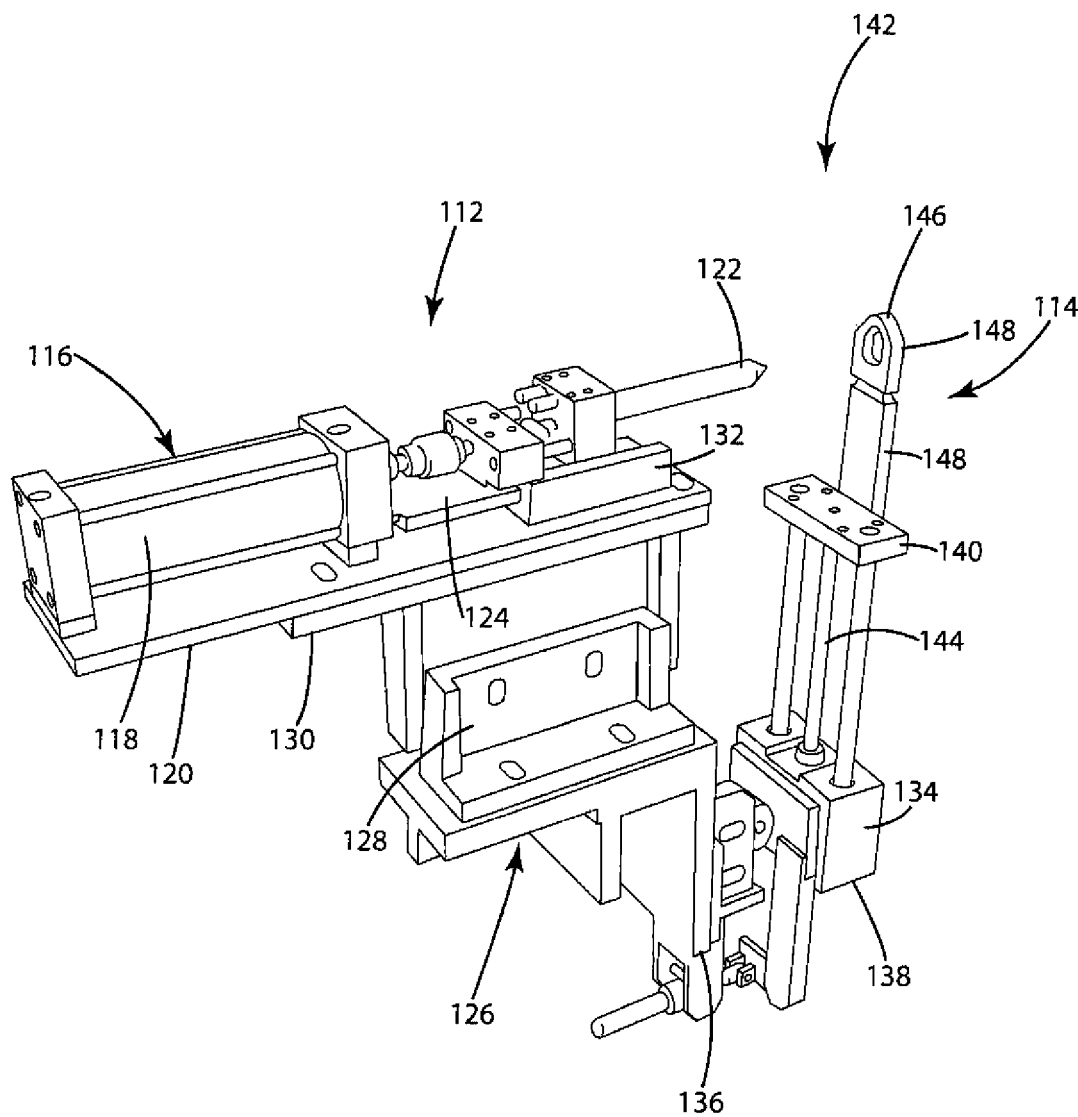
FIG. 2 is a perspective and essentially "stand alone" view of the side blow device forming a part of the side blow molding apparatus.

The principles of the invention are disclosed, by way of example, in a side blow molding apparatus 100, as described herein and illustrated in FIGS. 1 and 2. A principal advantage of the side blow molding apparatus 100 in accordance with the invention is that it can be utilized to blow mold plastic articles where relatively tight tolerances on the dimensions of the inner walls of the articles are required. Such blow molded articles can include, for example, engine resonator necks where tight tolerances need to be held with respect to the dimensions of the inside wall of the necks. Because of the lengths and shapes of certain engine resonators and other blow molded articles, it is substantially difficult to use the bottom blow process.

In part, the apparatus 100 and other apparatus in accordance with the invention provide for the molding of articles which cannot be bottom blown, to be formed with a relatively conventional parison, and yet still be capable of forming an inside wall having dimensions within relatively tight tolerances. As earlier described, the reference to the dimensions of the inside wall may be referred to herein as the "ID" or "inside diameter."

More specifically, with the use of side blow technology in accordance with the invention, the geometry of the articles to be molded is not substantially restricted, in the manner in which such geometry is restricted when bottom blow technology is utilized. Still further, with side blow technology in accordance with the invention as described herein, multiple inner features can be formed using apparatus and methods in accordance with the invention.

Turning specifically to the drawings, FIG. 1 illustrates a perspective view of the major components of the side blow molding apparatus 100, which can be used with components in accordance with the invention. The side blow molding apparatus 100 includes a conventional base frame 102, having legs 104 which can be supported on any type of appropriate surface. Extending linearly through the apparatus 100 are a set of upper guide rails 106 and lower guide rails 108. These rails 106, 108 are utilized to appropriately guide various sliding components used with the apparatus 100.

It should be noted that the side blow molding apparatus 100 also includes a number of other various components. Many of these components are conventional in nature and will not be described in detail herein. Such conventional components of the side blow molding apparatus 100 are described in various prior art references, including those references cited in the section of this application entitled "Background Art." For example, such components can include a conventional pneumatic system having various types of hoses, valves and other components, including a high pressure air source. In addition, the molding apparatus 100 can include cooling devices for purposes of cooling the parison after completion of the molding process. In addition to these components, computer apparatus, including programmable controllers, can be utilized to appropriately sequence the various process steps associated with the operation of the side blow molding apparatus 100. The automated technology can include numerical control machines and various other types of computerized apparatus.

The novel concepts of the side blow molding apparatus 100 in accordance with the invention are found primarily embodied within the structure and operation of a side blow device 110, primarily shown in a "stand alone" perspective view in FIG. 2. The side blow device 110 can be characterized as comprising two principal component assemblies. These component assemblies include what is characterized as a blow pin assembly 112 and an inner support assembly 114, both of which are again shown in FIG. 2 as part of the side blow device 110. The blow pin assembly 112 can be characterized as being structured on a slide system, with the slide system essentially performing the function of shuttling a blow pin in and out of the molding area. Correspondingly, the inner support assembly 114 can be characterized as being constructed on an air cylinder apparatus, with the air cylinder apparatus raising and lowering the inner support assembly 114.

More specifically, the blow pin assembly 112 includes a blow pin driver 116. The blow pin driver 116 can be formed as a cylinder 118 mounted in a stationary manner on a cylinder base 120. Within the cylinder 118 can be a cylinder piston (not shown) which can be operated by appropriate pneumatic controls (not shown) so as to appropriately move the piston.

In addition to the blow pin driver 116, the blow pin assembly 112 includes the blow pin 122, again as shown in FIG. 2. The blow pin 122 is connected to a shuttle system 124 which, in turn, can be connected to the cylinder 118. The shuttle system 124 operates so as to move the blow pin 122 in a linear manner. The blow pin 122 and the shuttle system 124 rest in part on a shuttle base 132. The entirety of the blow pin assembly 112 rests on a lower base mounting bracket 126. The base mounting bracket 126 is connected to an intermediate bracket 128 mounted above the mounting bracket 126. Correspondingly, an upper bracket 130 is mounted intermediate the intermediate bracket 128 and the cylinder base 120. All of the mounting bracket and base components remain stationary during operation.

Turning to the inner support assembly 114, and again primarily with respect to FIG. 2, the inner support assembly 114 includes an inner support mounting bracket 134 at the lower portion thereof. The mounting bracket 134 is connected to a connecting bracket 136. In turn, the connecting bracket 136 is connected in a stationary manner to the base mounting bracket 126 previously described herein. The inner support mounting bracket 134 mounts an inner support driver 138. The inner support driver 138 can be in the form of an air cylinder (not specifically shown), with an interconnected pneumatic control system (not shown). The inner support driver 138 is connected through a vertically disposed extender 144 to an upper driver bracket 140. In turn, the upper driver bracket 140 is connected to an inner support 142 having the shape and configuration as primarily shown in FIG. 2. The inner support 142 includes an upper section 146 and a lower section 148. In operation, the inner support driver 138 can be utilized to extend and retract the extender 144 which, in turn, will raise and lower the inner support 142. In summary with respect to the entirety of the foregoing, the blow pin 122 is built on a shuttle system 124 which shuttles the pin 122 in and out of the parison. Correspondingly, the inner support 122 is positioned on an inner support driver 138 which can include an air cylinder or the like so as to raise and lower the inner support assembly 114.

The operation of the side blow molding apparatus 100 in accordance with the invention will now be described. It should again be noted that the novel concepts associated with the side blow technology provide an advantage in that these concepts permit blow molded articles that cannot be bottom blown to be formed with a conventional parison and still be able to form the inner diameter of article components having extremely tight tolerances. The principal concept associated with this technology is the concept of piercing the parison with the blow pin, and with the blow pin staying inside the parison as the mold closes. This function then forms the inner diameter of the article neck. It should be emphasized that the use of the inner support is critical to the operation of the system. That is, without the inner support, the blow pin is unlikely to be able to pierce the parison.

In describing the operation of the apparatus 100, reference again is made to FIG. 1, which illustrates the blow mold 150 and the parison 152. In an initial state, to begin an operational sequence, the mold 150 is in an open position, and the blow pin 122 is in a retracted or "home" position. Correspondingly, the inner support driver 138 and inner support 142 are in an extended and ready position. At this time, the apparatus 100 then operates to extrude the parison 152. The parison 152 will drop over the inner support 142.

When the parison 152 has been fully extruded, the blow pin driver 116 can be activated. This will cause the shuttle system 124 of the side blow device 110 to operate so as to extend the blow pin 122 in a manner such that the blow pin 122 will pierce the parison 152. When the blow pin 122 has been fully extended into the parison 152, the inner support guide is then retracted. The blow mold 150 is then closed. At this time, it should be emphasized that although the mold 150 is closed, the blow pin 122 remains inside the parison 152.

A forming and cooling cycle is then initiated, using principles of blow mold cooling well known in the art. At the end of the cooling cycle, the blow pin 122 can be retracted to its retracted or home position. With the pin 122 retracted, the finished part can be ejected from the side blow molding apparatus 100. At this time, the inner support driver 138 can extend the extender 134 and inner support 142, with the extension positioning the inner support 142 to its "ready" position. The foregoing cycle can then be repeated for another blow molded article.

Again, it should be emphasized that with the use of the side blow device 110 and the principles of operation associated therewith, the part geometry of the article to be molded does not particularly restrict the use of the process described herein. This is a problem with respect to the use of bottom blow technology. Also, and as earlier stated, multiple inner features can be formed using this process in accordance with the invention.

It will be apparent to those skilled in the pertinent arts that other embodiments of blow molding apparatus in accordance with the invention can be designed. That is the principles of a blow molding apparatus in accordance with the invention are not limited to the specific embodiment described herein. Accordingly, it will be apparent to those skilled in the art that modifications and other variations of the above-described illustrative embodiment of the invention may be effected without departing from the spirit and scope of the novel concepts of the invention.

The invention claimed is:

1. A method for forming a plastic article having a calibrated neck, using the principles of blow molding and employing a blow mold and a blow pin, said method comprising:

initiating an operation sequence with said blow mold in an open position and said blow pin in a retracted or home position;

extruding a parison over an inner support;

activating a blow pin driver, and causing a shuttle system of a side blow device to operate so as to extend said blow pin sufficiently so as to pierce a side of said parison;

retracting an inner support extender, thereby lowering said inner support;

closing said blow mold;

forming an article neck with said blow pin remaining inside said parison as said mold closes, thereby completing the function of forming an inner diameter of said article neck, and with said article neck being formed on said side of said parison;

initiating and activating a forming and cooling cycle;

retracting said blow pin;

ejecting a resultant plastic article; and repositioning said extender and said inner support to initial positions.

* * * * *